(12) United States Patent
Kawai

(10) Patent No.: US 9,426,330 B2
(45) Date of Patent: Aug. 23, 2016

(54) IMAGE FORMING APPARATUS AND IMAGE FORMING SYSTEM HAVING A USER AUTHENTICATION FUNCTION

(71) Applicant: KYOCERA Document Solutions Inc., Osaka (JP)

(72) Inventor: Takanao Kawai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/506,608

(22) Filed: Oct. 4, 2014

(65) Prior Publication Data

US 2015/0098112 A1    Apr. 9, 2015

(30) Foreign Application Priority Data

Oct. 4, 2013   (JP) ................................ 2013-209313
Oct. 4, 2013   (JP) ................................ 2013-209314

(51) Int. Cl.

| H04N 1/44 | (2006.01) |
|---|---|
| H04N 1/00 | (2006.01) |
| G06K 15/02 | (2006.01) |
| G06F 3/12 | (2006.01) |

(52) U.S. Cl.
CPC .......... H04N 1/4413 (2013.01); H04N 1/4426 (2013.01); H04N 1/4433 (2013.01); *H04N 2201/0094* (2013.01)

(58) Field of Classification Search
None
See application file for complete search history.

(56) References Cited

U.S. PATENT DOCUMENTS

| 2005/0114267 A1* | 5/2005 | Miwa ................... G06F 21/608 705/59 |
|---|---|---|
| 2006/0001897 A1* | 1/2006 | Ogasawara ........ H04N 1/32128 358/1.13 |
| 2007/0074028 A1* | 3/2007 | Makishima ........... H04L 9/3263 713/176 |
| 2008/0028438 A1* | 1/2008 | Sakakibara ........... G06F 21/608 726/2 |
| 2008/0066154 A1* | 3/2008 | Naota ................... G06F 21/608 726/2 |
| 2008/0088885 A1* | 4/2008 | Miyazaki .............. G06F 21/554 358/402 |
| 2010/0212026 A1* | 8/2010 | Yoshimura .............. G06F 21/12 726/29 |
| 2011/0055854 A1* | 3/2011 | Kawai ....................... G06F 8/61 719/327 |
| 2011/0063667 A1* | 3/2011 | Nishida ................. G06F 3/1222 358/1.15 |
| 2011/0122439 A1* | 5/2011 | Sato ...................... G06F 21/608 358/1.15 |
| 2011/0203005 A1* | 8/2011 | Hamada ................ G06F 21/608 726/28 |
| 2012/0327454 A1* | 12/2012 | Hasama .................. G06F 3/122 358/1.14 |
| 2013/0070296 A1* | 3/2013 | Ishibashi ............... G06F 3/1207 358/1.15 |

FOREIGN PATENT DOCUMENTS

JP    2012-254618 A    12/2012

* cited by examiner

*Primary Examiner* — Beniyam Menberu
(74) *Attorney, Agent, or Firm* — Hawaii Patent Services; Nathaniel K. Fedde; Kenton N. Fedde

(57) ABSTRACT

Provided an image forming apparatus that can realize an authentication function easily. (1) Transmit a printing requested data from a PC to a port for printing. (2) A user authentication application inputs printing requested data from the port for printing, and user determination data of the printing requested data are transmitted to a user authentication server. (3) The user authentication server transmits "use permission" or "use non-permission" to the user authentication application. (4) The user authentication application transmits the image data of the printing requested data to an application platform in case of "use permission." (5) The application platform transmits image data to a controller. (6) The controller outputs the image data to a printing part. (7) The user authentication application transmits "use non-permission" to the PC in case of "use non-permission."

11 Claims, 5 Drawing Sheets

IMAGE FORMING APPARATUS AND IMAGE FORMING SYSTEM HAVING A USER AUTHENTICATION FUNCTION

INCORPORATION BY REFERENCE

This application is based on and claims the benefit of priority from Japanese Patent Application No. 2013-209314 filed on Oct. 4, 2013, and Japanese Patent Application No. 2013-209313 filed on Oct. 4, 2013, and the contents of which are hereby incorporated by reference.

BACKGROUND

The present disclosure is related to the image forming apparatus and image forming system that have a user authentication function.

Typical image forming apparatus(s), such a printer or a MFP (Multifunction Peripheral) has a function to perform user authentication for which only an authorized user for use can use the image forming device (hereinafter, it calls "user authentication function"). In the user authentication, by user ID, a password, etc., which are inputted when a user uses an image forming apparatus, it determines whether or not a user is permitted to use, and only the user determined that use is permitted can use the image forming apparatus. If the image forming apparatus provides such the user authentication function, it can be prevented: an image data of confidential documents is formed with the image forming apparatus by a user whom use is not permitted, and the confidential documents is brought out by print or FAX transmission for the formed image data.

Thus, in order to prevent brought out of the confidential documents, for example, in one case of image forming apparatus, when printing instructions are input from a client terminal, print data are not outputted as it is, but it is once stored and accumulated to HDD (storage part) in the image forming apparatus. Then, if user authentication is carried out by a started authentication application, a print-data list screen is displayed, and the user chooses print data to print-out from the print-data list screen. In this way, since the print-data list screen is displayed by having done the user authentication and printing is performed by final printing instructions by the user, the confidential documents can be prevented from being perused or printed by a user who is not performed the user authentication.

SUMMARY

An image forming apparatus of the present disclosure provides a requested data input part, a user-determination-data transmission part, and a notice data receiving part. The requested data input part inputs the requested data, which user determination data and image data are stored, from a port of user authentication application. The user-determination-data transmission part transmits the user determination data to an external user authentication server. The notice data receiving part receives notice data of use permission or use non-permission of the image forming apparatus from the user authentication server. When the notice data receiving part receives the notice data of use permission, an image data process of the image data is performed.

An image forming system of the present disclosure is an image forming system that has an operation terminal, an image forming apparatus, and a user authentication server. The operation terminal includes a requested data transmission part and a use-non-permission notice data receiving part. The requested data transmission part transmits requested data, which is stored user determination data and image data, to a port of user authentication application of the image forming apparatus. The use-non-permission notice data receiving part receives the notice data of use non-permission from the image forming apparatus. The image forming apparatus provides a requested data input part, a user-determination-data transmission part, and a notice data receiving part. The requested data input part inputs the requested data from a port of the user authentication application. The user-determination-data transmission part transmits the user determination data to the user authentication server. The notice data receiving part receives the notice data of use permission or use non-permission of the image forming apparatus from the user authentication server. The user authentication server has a user-determination-data receive part and a notice data transmission part. The user-determination-data receive part receives the user determination data from the image forming apparatus. The notice data transmission part transmits the notice data of use permission or use non-permission to image forming apparatus. If the image forming apparatus receives the notice data of use permission by the notice data receiving part, an image data process of the image data is performed.

An image forming apparatus of the present disclosure includes a requested data input part, a user-determination-data transmission part, and a notice data receiving part. The requested data input part inputs requested data, which user determination data and image data are stored, from a port of a controller. The user-determination-data transmission part transmits the user determination data to an external user authentication server. The notice data receiving part receives notice data of use permission or use non-permission of the image forming apparatus from the user authentication server. If the notice data receiving part receives the notice data of use permission, an image data process of the image data is performed.

DETAILED DESCRIPTION

First Embodiment

According to a first embodiment, PC (personal computer) transmits printing requested data, which stores user determination data being set user ID and password and image data of a PC to an image forming apparatus. The image forming apparatus extracts the user determination data and the image data from the printing requested data. The image forming apparatus performs to print the image data if it judges a user is permitted to use the image forming apparatus by the user determination data.

Figure 1:
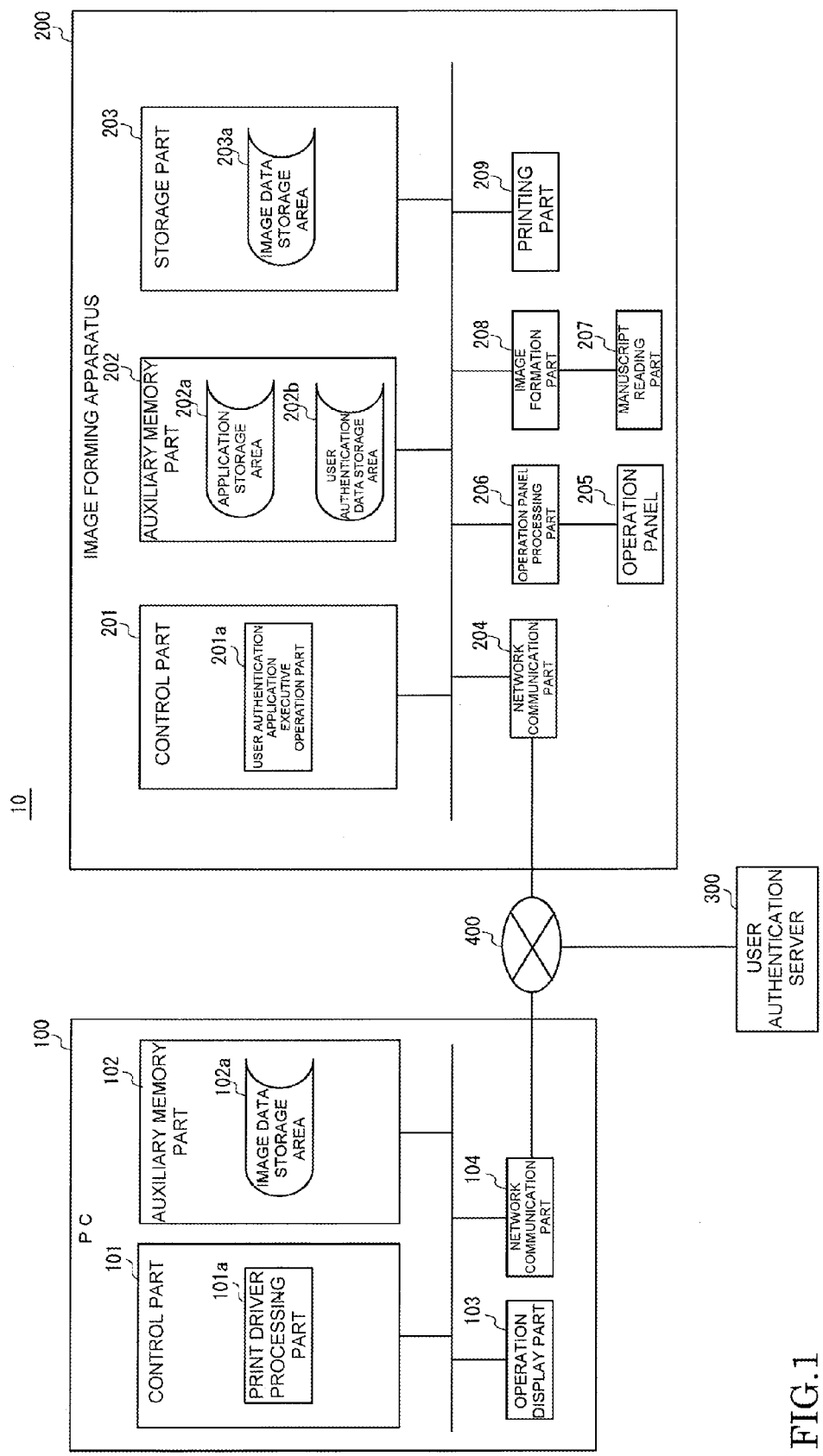
FIG. 1 is a figure showing functional configuration of an image forming system related to a first embodiment.

Functional configuration of image forming system 10 in the first embodiment is explained by using FIG. 1. Image forming system 10, as shown in FIG. 1, includes a PC100, an image forming apparatus 200, and a user authentication server 300. The PC100, the image forming apparatus 200, and the user authentication server 300 are connected in a network 400.

The PC100 is an operation terminal. The PC100 is installed a print driver of the image forming apparatus 200. The PC100 transmits user determination data, which is for determining whether or not a user is an authentic user for the image forming apparatus 200, to the image forming apparatus 200. The PC100 also transmits printing requested data, which stores the image data of a manuscript to print-out, or the like, to the image forming apparatus 200.

The image forming apparatus 200 is a printer, a MFP, or the like. The image forming apparatus 200 includes user authentication data, which has set user ID of a user who is permitted to use the image forming apparatus 200 and a password corresponding to the user ID. When the user direct input the user ID and the password by an operation panel 205, which is described later, in the image forming apparatus 200, a user authentication process is performed by the user authentication data provided in the image forming apparatus 200. That is, by using the user ID and the password, a typical user authentication process is performed. When the printing requested data is received from the PC100, the image forming apparatus 200 extracts the user determination data from the printing requested data and transmits the user determination data to the user authentication server 300. Thereby, the user authentication server 300 determines whether or not the user of the user ID set in the user determination data is permitted to use. In case that the notice data, which the user is permitted to use, is received from the user authentication server 300, the image forming apparatus 200 extracts the image data from the printing requested data and performs a printout. Also, in case that the notice data, which the user is not a user who is permitted to use, is received from user authentication server 300, the image forming apparatus 200 transmits the notice data to the PC100.

The user authentication server 300 has user authentication data that a password corresponding to the user ID of the authorized user, who is permitted to use the image forming apparatus 200, has been set. The user authentication server 300 is a server that performs user authentication by the user authentication data.

If the user determination data are received from image forming apparatus 200, the user authentication server 300, by using the user authentication data, judges whether or not the user of the user ID in the user determination data is permitted to use the image forming apparatus 200.

Also, the user authentication server 300 transmits the notice data, which the user is permitted or not use of the image forming apparatus 200, to the image forming apparatus 200.

In addition, the user authentication server 300 functions as a user-determination-data receive part and a notice data transmission part by executing a control program memorized in the storage part by the control part.

At first, functional configuration of the PC100 is explained by using FIG. 1. As shown in FIG. 1, the PC100 includes a control part 101, an auxiliary memory part 102, an operation display part 103, and a network communication part 104. Each part of them is connected by bus, or the like.

The control part 101 (an example of a requested data transmission part and a use-non-permission notice data receiving part) has a storage part, and a control-and-compute part. The control part 101 performs entire control of the PC100, which includes various I/O, an interface, a bus controller, or the like. The print driver treating part 101*a* is provided in control part 101.

The print driver treating part 101*a* transmits the user determination data and the print request data to the image forming apparatus 200 via the network communication part 104. In the user determination data, the user ID and the password inputted by the user are set. Also, the image data, or the like, are stored in the print request data.

The auxiliary memory part 102 is an auxiliary storage unit that has a flash memory, or the like. The auxiliary memory part 102 memorizes a program of processes that the control part 101 executes and data. The image data storage area 102*a* is provided in the auxiliary memory part 102.

The image data storage area 102*a* stores the image data or the like, which are scanned by a scanner, or the like. The image data is extracted in a time when the print request is performed to the image forming apparatus 200.

The operation display part 103 provides an operation panel. The operation display part 103 inputs operation of a user from the operation panel. The operation display part 103 also displays an operation result of the user and the notice data received from the image forming apparatus 200.

The network communication part 104 includes a detachable LAN interface for connecting to the network 400. The LAN interface includes the network part that performs intelligent transmission and reception by using various network protocols.

Next, the functional configuration of the image forming apparatus 200 is explained. As shown in FIG. 1, image forming apparatus 200 includes a control part 201, an auxiliary memory part 202, a storage part 203, a network communication part 204, an operation panel 205, an operation panel processing part 206, a manuscript reading part 207, an image formation part 208, and a printing part 209. Each part of them is connected by bus, or the like.

The control part 201 (an example of a requested data input part, a user-determination-data transmission part, and a notice data receiving part) includes a control-and-compute part. Also, the control part 201 stores various I/O, an interface, a bus controller, or the like, and overall image forming apparatus 200 is controlled by these. The control part 201 provides function of a user authentication application executive operation part 201*a*.

The user authentication application executive operation part 201*a* executes an application that performs the user authentication when the image forming apparatus 200 receives print request data from the PC100. The details of the user authentication application executive operation part 201*a* are described later.

The auxiliary memory part 202 is an auxiliary storage unit. The program for processing that the control part 201 performs and data are memorized in the auxiliary memory part 202.

The application storage area 202*a* and the user authentication data storage area 202*b* are provided in the auxiliary memory part 202.

The application storage area 202*a* stores the program and data of the application, which is created by the user and except for the program already having been provided in the image forming apparatus 200.

The user authentication data storage area 202b stores the user authentication data. The user authentication data is the data, which the password corresponding to the user ID of the user who is permitted to use the image forming apparatus 200 has been set. The user authentication data in the user authentication data storage area 202b is used for the existing user authentication process in the image forming apparatus 200.

The storage part 203 stores data and a program. The image data storage area 203a is provided in the storage part 203. The image data storage area 203a stores the image data, which the manuscript read by the manuscript reading part 207 is performed image formation by the image formation part 208. Also, the image data storage area 203a stores the image data received from the PC100 via the network communication part 204.

The network communication part 204 includes a detachable LAN interface for connecting to the network 400. The LAN interface includes the network part that performs intelligent transmission and reception by using various network protocols.

The operation panel 205 displays an operation menu and receives operation by a finger of the user. Also, the user inputs the user ID and the password in the operation panel 205, and the variety of information set for the image forming apparatus 200 can be inputted.

The operation panel processing part 206 performs a process that displays operation items of function provided in the image forming apparatus 200 on the operation panel 205. The operation panel processing part 206 performs a process that inputs the user ID, the password, operation information of the operation that the user performs, and a setting data for the image forming apparatus 200, by using the operation panel 205.

The manuscript reading part 207 reads the manuscript set to a manuscript stand of the image forming apparatus 200. When the user makes a read request from the operation panel 205, the manuscript reading part 207 reads the manuscript set to the manuscript stand.

The image formation part 208 converts the image data from raw data of the manuscript read by the manuscript reading part 207 by the read request of the user. The image data is data having a data format that can be printed by the printing part 209, or can be transmitted by FAX or e-mail.

The printing part 209 prints the image data having the printing request of the user.

Figure 2:
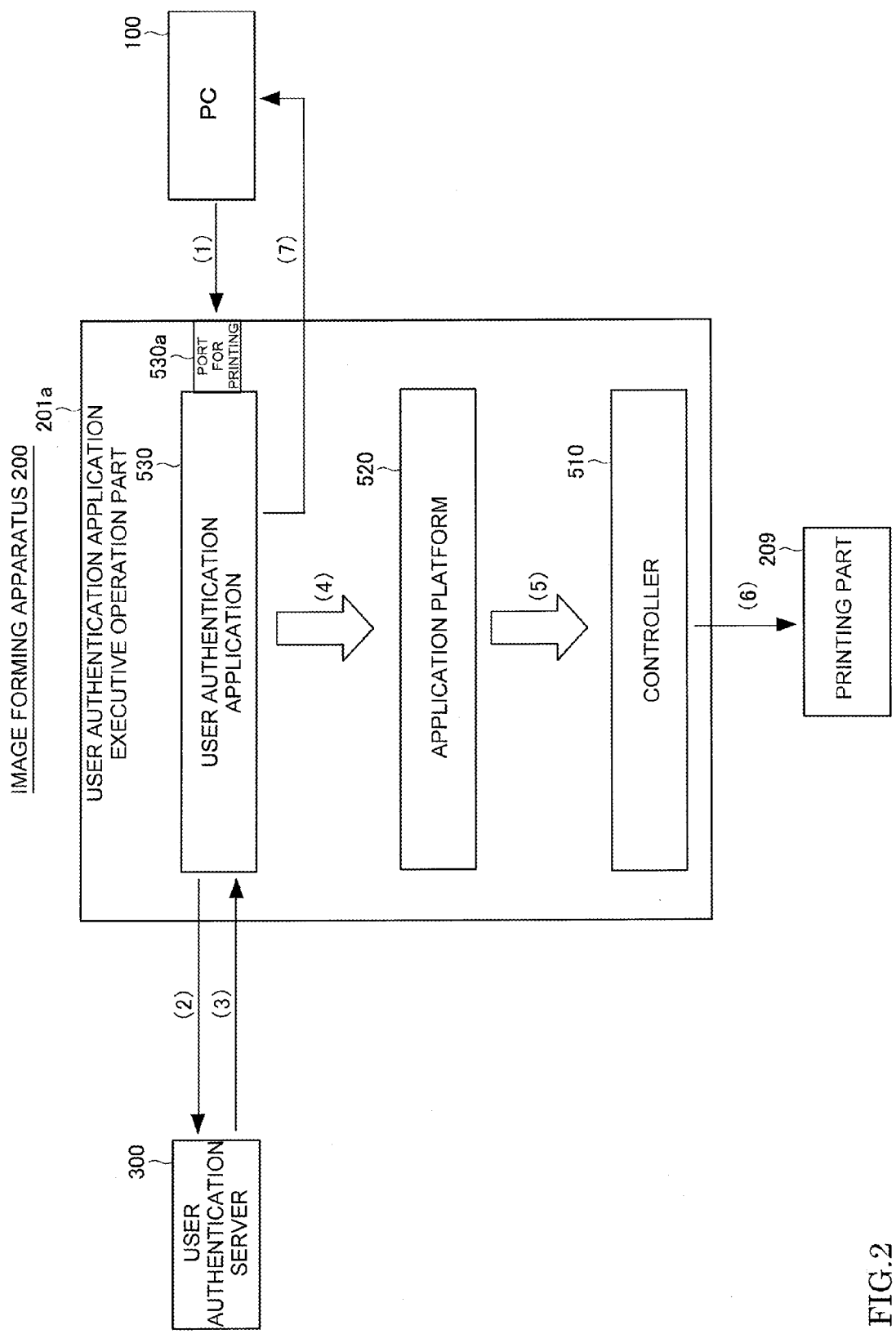
FIG. 2 is a figure showing software structure of a user authentication application executive operation part of the image forming apparatus and a procedure of user authentication related to the first embodiment.

Next, the software structure of the user authentication application executive operation part 201a in the first embodiment of the present disclosure is explained by using FIG. 2. As shown in FIG. 2, the software structure of the user authentication application executive operation part 201a includes a controller 510, an application platform. 520, and a user authentication application 530. Also, a port for printing 530a is provided in the user authentication application 530.

The controllers 510 operates software of FW (firmware) or the like for performing device standard functions, such as operation of printing, operation of a scanner, or control of a network controller. For example, if it is operation of printing, the controller 510 analyzes the image data inputted from the application platform 520. Then, the controller 510 performs operation that prints the image data on a print sheet to the printing part 209.

The application platform 520 operates software that operates basic function of OS (Operating System), in order to execute the application. When the image data is inputted from the user authentication application 530, the application platform 520 outputs it to the controller 510.

The user authentication application 530 makes the user authentication server 300 perform the user authentication by the user determination data that is stored in the printing requested data received from the PC100. Also, the user authentication application 530 outputs the image data stored in the printing requested data to the application platform 520. The application operates a software that a user can create, which is other than the function having in the image forming apparatus 200 as standard. Also, the application can perform the device standard function of the controller 510 by calling API (Application Interface) that is provided in the application platform 520.

The port for printing 530a is an opened port and is an interface for performing the direct input the printing requested data, which is transmitted from the PC100, from the network communication part 204.

Figure 3:
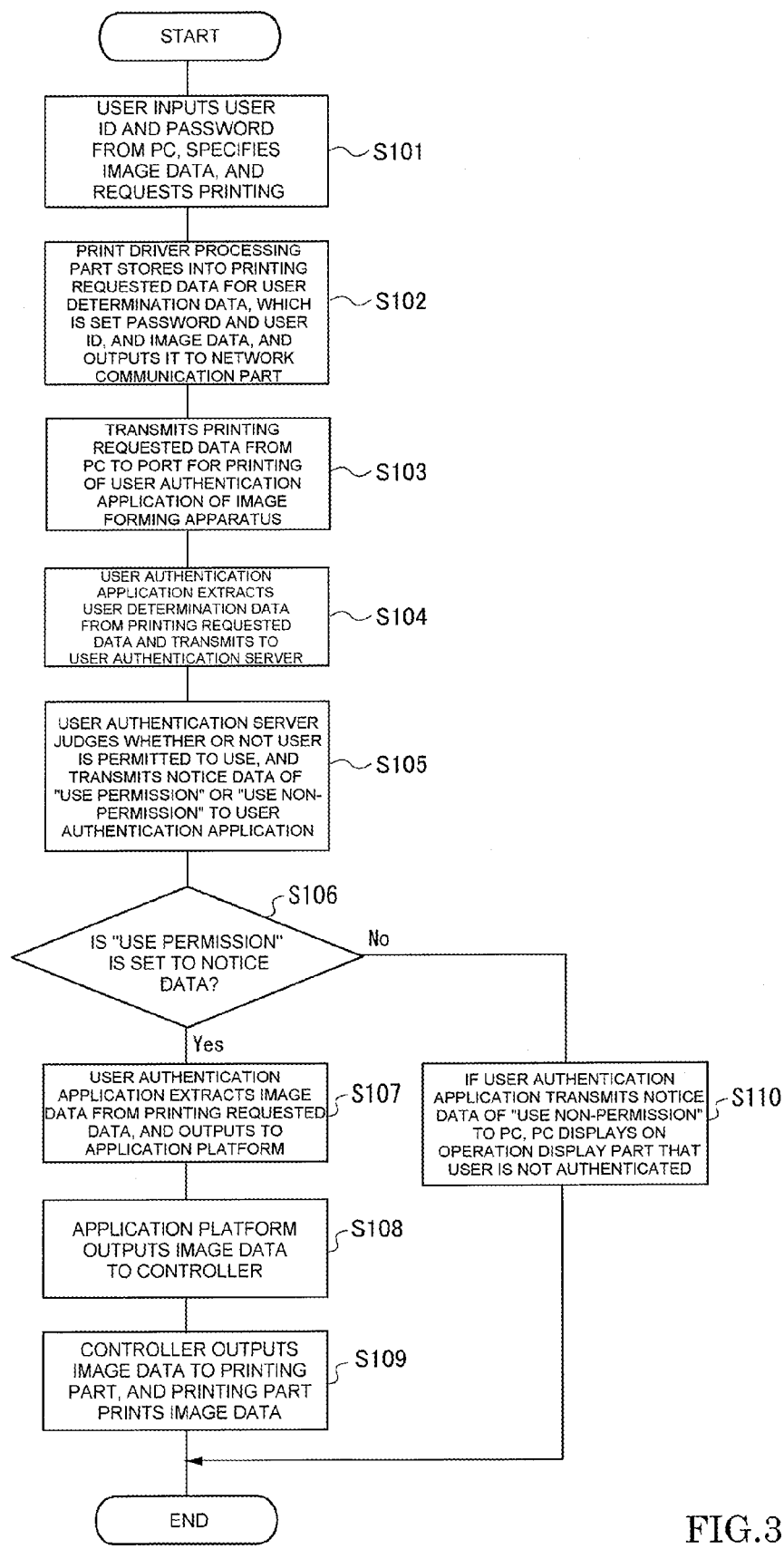
FIG. 3 is a flow chart that shows a process of user authentication in printing requested data related to the first embodiment.

Then, the process of the user authentication in the printing requested data transmitted to the image forming apparatus 200 from the PC100 related to the first embodiment of the present disclosure is explained by using FIG. 2 and FIG. 3. Hereinafter, the user authentication process as shown in FIG. 3 is explained in order of a step.

(Step S101)

Firstly, a user inputs user ID and a password from the operation display part 103 of the PC100, specifies an image data of the image data storage area 102a, and performs a printing request.

(Step S102)

Subsequently, the print driver processing part 101a retrieves a specified image data from the image data storage area 102a. The print driver processing part 101a stores the user determination data, which has been set the inputted user ID and the password, and the extracted image data to printing requested data. Also, the print driver processing part 101a outputs the printing requested data to the network communication part 104 in order to transmit the printing requested data to the image forming apparatus 200.

(Step S103)

Subsequently, the network communication part 104 inputs the printing requested data. Then, as shown in (1) of FIG. 2, the network communication part 104 transmits the printing requested data to the port for printing 530a in the user authentication application 530 via the network communication part 204 of the image forming apparatus 200.

(Step S104)

Subsequently, the user authentication application 530 inputs the printing requested data from the port for printing 530a. Then, the user authentication application 530 extracts the user determination data from the printing requested data. User authentication application 530 transmits the extracted user determination data to the user authentication server 300 via the network communication part 204, as shown in (2) of FIG. 2.

(Step S105)

Subsequently, the user authentication server 300 judges whether or not the user having the user ID is a user who is permitted to use the image forming apparatus 200 by the user authentication data, which the user authentication server 300 has. The user authentication server 300 sets "use permission" to notice data if the user is a user who is permitted to use. The user authentication server 300 sets "use non-permission" to the notice data if the user is not a user who is permitted to use. The user authentication server 300 transmits the notice data to the user authentication application 530 of the image forming apparatus 200, as shown in (3) of FIG. 2.

(Step S106)

Subsequently, when the notice data is received from the user authentication server 300, the user authentication application 530 judges whether or not "use permission" is set to the notice data. If "use permission" is set to the notice data (Yes in Step S106), the user authentication application 530 progresses to Step S107. If "use non-permission" is set to the notice data (No in Step S106), the user authentication application 530 progresses to Step S110.

(Step S107)

For the case "Yes" in Step S106, the user authentication application 530 extracts the image data from the printing requested data. The user authentication application 530 outputs the extracted image data to an application platform, as shown in (4) of FIG. 2.

(Step S108)

Subsequently, when the image data is inputted, the application platform 520 outputs it to the controller 510, as shown in (5) of FIG. 2.

(Step S109)

Subsequently, when the image data is inputted, the controller 510 outputs it to the printing part 209, as shown in (6) of FIG. 2. The printing part 209 prints the image data on a print sheet.

(Step S110)

For the case "No" in Step S106, the user authentication application 530 transmits the notice data, which "use non-permission" has been set up, to the PC100 via the network communication part 204, as shown in (7) of FIG. 2. When the PC100 receives the notice data in which "use non-permission" has been set, the PC100 displays a message, which shows the user is not authenticated, to operation display part 103.

As mentioned above, in the image forming system 10 for the first embodiment, the printing requested data is transmitted from the PC100 to the port for printing 530a in the user authentication application 530 provided in the image forming apparatus 200. Thereby, the user authentication application 530 can perform the user authentication by using the user authentication server 300. In a typical existing user authentication process, by using an authentication function embedded in FW, the user authentication is performed by the user ID and the password, which the user has set in the operation panel 205. On the other hand, for the present embodiment, in the case of receiving the printing requested data, which stores the user determination data, from the PC100, the printing requested data can be inputted from the port for printing 530a, and the user authentication application 530 can perform the user authentication process. Therefore, modification of the existing user authentication process embedded in FW will not be needed. Also, without changing the print driver process that is performed by the print driver processing part 101a, the PC100 can transmit the printing requested data to the image forming apparatus 200 only by changing transmitting destination to the port for printing 530a. Also, if the user authentication application 530 is set to output image data to a default print port of the controller 510 without sending via the application platform 520, changing FW will not be required. Also, the user authentication server 300 can manage the user ID and the password in a unified manner by performing the user authentication by using the user authentication server 300. Thus, it will be unnecessary to change the user authentication data, which is provided in the image forming apparatus 200, in every case when the user ID and the password are changed, added, or deleted.

That means, typically, in order to perform the user authentication, the image forming apparatus should provide the user authentication function beforehand. Thus, as for the authentication function of the typical image forming apparatus, the standard function is embedded as FW, changing or adding to the original authentication function after setting up cannot be easy. For this reason, there is a problem in the typical apparatus that, when new authentic method and authentication procedure are needed, the existing user authentication function of the image forming apparatus is to be changed, and thus the image forming apparatus is need to be reconstructed.

On the other hand, the image forming apparatus and the image forming system in the present disclosure can realize to have new user authentication function easily, when the new authentic method and the authentication procedure are required.

In addition in the first embodiment, the image forming system 10 as shown in FIG. 1 includes one PC100 and image forming apparatus 200. However, actually, it may have a plurality of PC100 and image forming apparatuses 200. Thus, when the plurality of image forming apparatuses 200 exist in the image forming system 10, it is preferred to be set the network communication part 104 of the PC100 recognizes port for printing 530a to each the image forming apparatus 200. As set in this way, the PC100 can transmit the printing requested data to the port for printing 530a for the image forming apparatus 200 specified by the user.

Also, in the first embodiment, the user ID and the password are set in the user determination data, and the user authentication is performed by the user ID and the password. However, it is not limited in this way. For example, the user authentication server 300 may have a function to judge whether or not a user is permitted to use by using the digital signature of the user. In this case, the PC100 sets the digital signature of the user in the user determination data. Then, the user authentication server 300 is able to perform the user authentication by the digital signature of the user determination data.

Also, in the first embodiment, the printing requested data, which stores the user determination data and the image data, is transmitted from the PC100 to the image forming apparatus 200. Then, it is explained the process to print the image data when use of the user is permitted by the user determination data. However, it is not limited in this way.

For example, the FAX transmission request data, which stores user determination data and image data, may be transmitted from the PC100 to the image forming apparatus 200. In this case, when use of the user is permitted by the user determination data, transmitting the image data to the address specified by FAX is also possible. Also, the image storage request data, which stores user determination data and image data, is transmitted from the PC100 to the image forming apparatus 200, and, when use of the user is permitted by the user determination data, storing the image data to the image data storage area 203a in the image forming apparatus 200 is also possible. In order to transmit such the FAX transmission request data and the image storage request data from the PC100 to the image forming apparatus 200, for example, a FAX transmission application may be provided in the image forming apparatus 200. Also, a FAX transmission port that inputs the FAX transmission request data to the FAX transmission application may be provided. Thereby, a FAX transmission function is realizable easily.

Similarly, an image storage application may be provided in the image forming apparatus 200, and the image storage port that inputs the image storage request data into the image storage application may be provided. Thereby, an image storage function can be realize easily.

Second Embodiment

Figure 4:
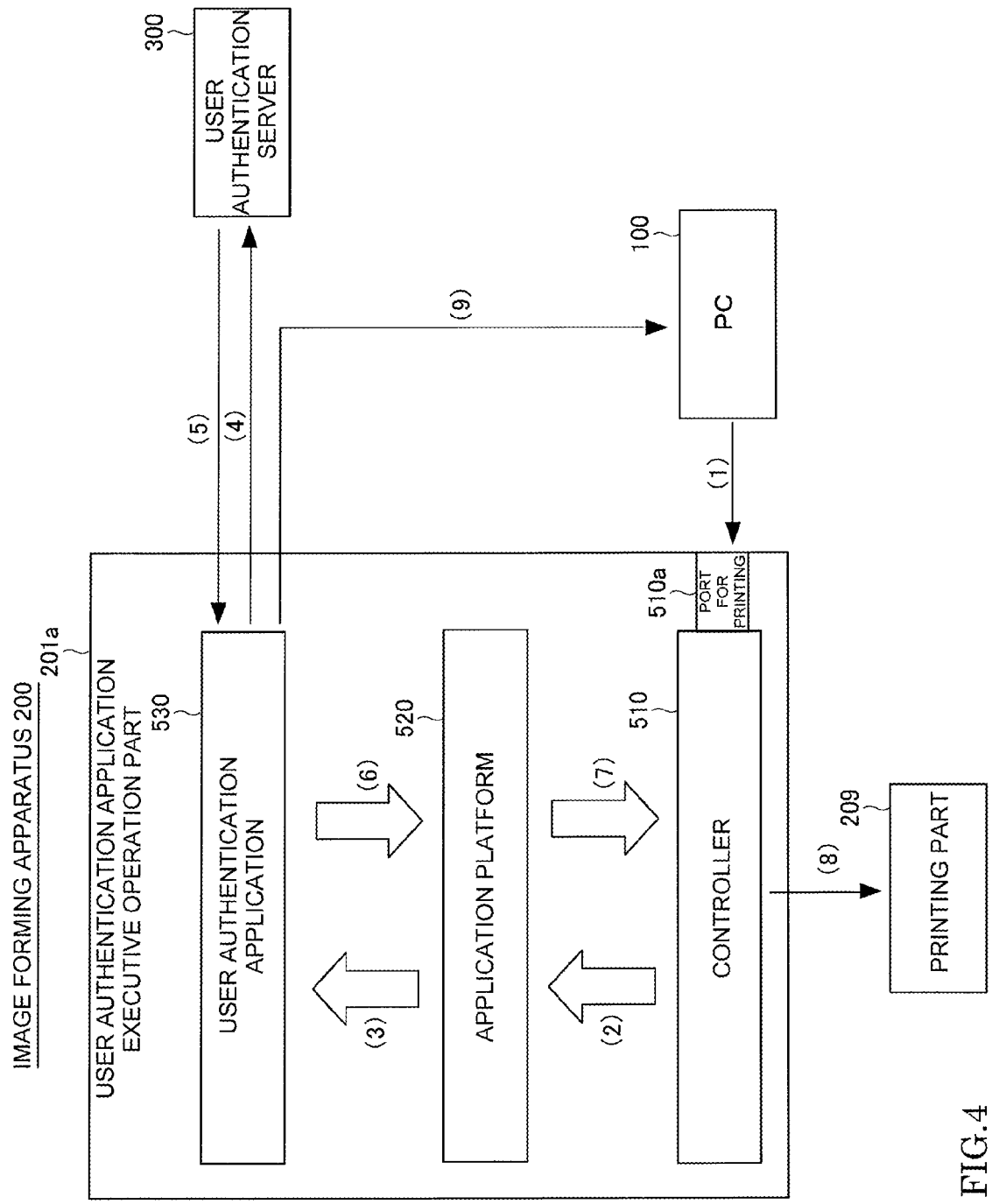
FIG. 4 is a figure showing software structure of a user authentication application executive operation part of the image forming apparatus and a procedure of user authentication related to a second embodiment.

Then, software structure of a user authentication application executive operation part 201*a* as a second embodiment is explained by using FIG. 4.

As for the user authentication application executive operation part 201*a* in the second embodiment, a port for printing 510*a* is provided in the controller 510. In FIG. 4, the other numerals which indicates the same numerals as shown in FIG. 1 and FIG. 2 show almost the same composition. However, the operations of them may be different.

Also, in the second embodiment, for example, if it is an operation of printing, the controller 510 extracts the user determination data and the image data from the printing requested data and outputs the user determination data to the application platform 520. Also, the controller 510 analyzes image data and performs printing part 209 for an operation that prints the image data on a print sheet.

The port for printing 510*a* is an opened port and is an interface for performing a direct input of the printing requested data, which is transmitted from PC100, from the network communication part 204.

Also, in the second embodiment, when the user determination data are inputted from the controller 510, the application platform 520 outputs it to the user authentication application 530.

Also, in the second embodiment, the user authentication application 530 makes the user authentication server 300 perform the user authentication by the user determination data inputted from the application platform 520.

Figure 5:
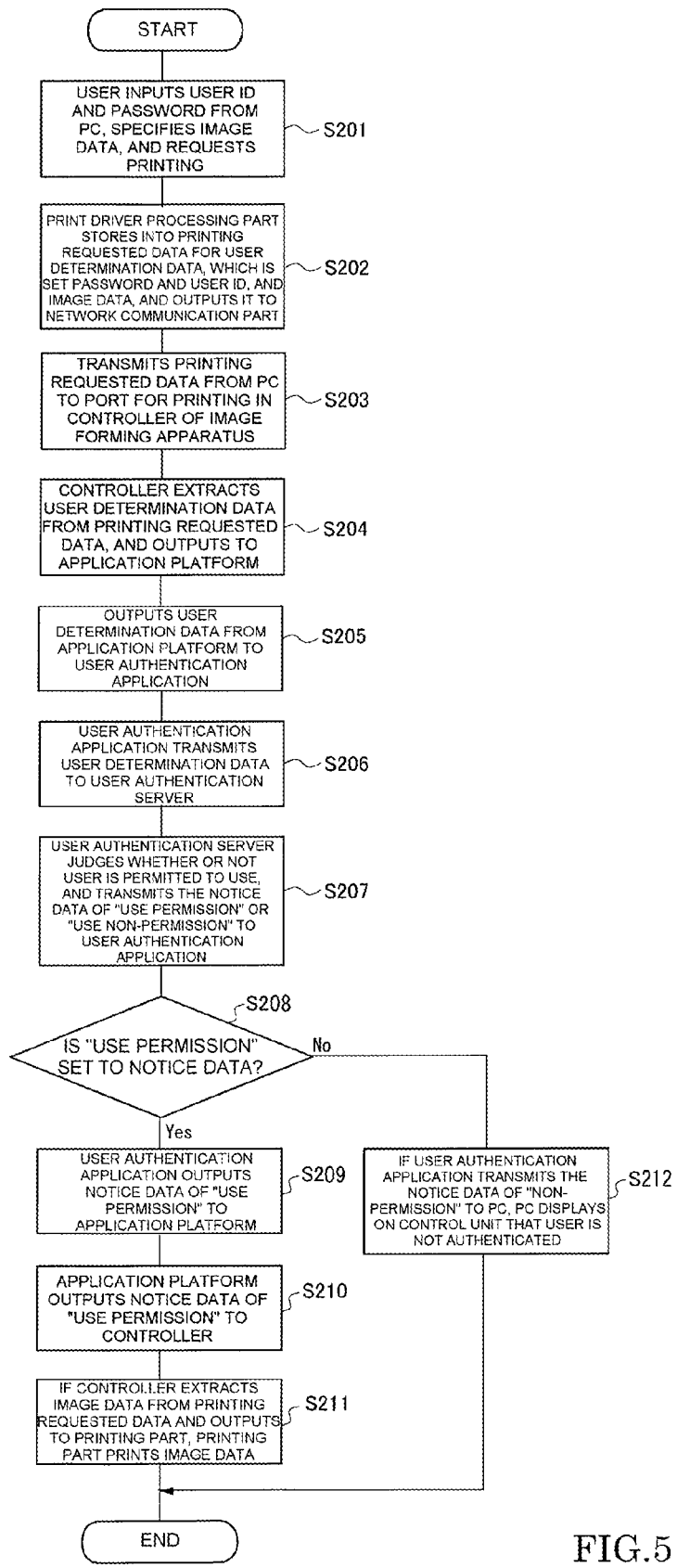
FIG. 5 is a flow chart that shows the procedure of user authentication in printing requested data related to the second embodiment.

Then, the process of the user authentication in the printing requested data transmitted from the PC100 to the image forming apparatus 200 related to the second embodiment in the present disclosure is explained by using FIG. 4 and FIG. 5. Hereinafter, it explains in order of a step of the user authentication process as shown in FIG. 5.

(Step S201)

Firstly, a user inputs user ID and a password from the operation display part 103 of the PC100, specifies an image data of the image data storage area 102*a*, and performs a printing request.

(Step S202)

Subsequently, the print driver processing part 101*a* extracts the specified image data from the image data storage area 102*a*. The print driver processing part 101*a* stores the user determination data, which is set the inputted user ID and the password, and the extracted image data to the printing requested data. The print driver processing part 101*a* outputs the printing requested data to network communication part 104, in order to transmit the printing requested data to the image forming apparatus 200.

(Step S203)

Subsequently, the network communication part 104 inputs the printing requested data. Then, the network communication part 104 transmits the printing requested data to the port for printing 510*a* in the controller 510 via the network communication part 204 of the image forming apparatus 200 as shown in (1) of FIG. 4.

(Step S204)

Subsequently, the controller 510 inputs the printing requested data from the port for printing 510*a*. Then, the controller 510 extracts the user determination data from the printing requested data, and as shown in (2) of FIG. 4, the controller 510 outputs it to the application platform 520.

(Step S205)

Subsequently, the application platform 520 inputs the user determination data from the controller 510. Then, the application platform 520 outputs the user determination data to the user authentication application 530, as shown in (3) of FIG. 4.

(Step S206)

Subsequently, the user authentication application 530 inputs the user determination data from application platform 520. Then, the user authentication application 530 transmits the user determination data to the user authentication server 300 via the network communication part 204, as shown in (4) of FIG. 4.

(Step S207)

Subsequently, by using the user authentication data provided in the user authentication server 300, the user authentication server 300 judges whether or not the user having the user ID is the user who is permitted to use the image forming apparatus 200. The user authentication server 300 sets "use permission" in notice data if the user is permitted to use. The user authentication server 300 sets "use non-permission" in the notice data if the user is not permitted to use. The user authentication server 300 transmits the notice data to the user authentication application 530 of the image forming apparatus 200, as shown in (5) of FIG. 4.

(Step S208)

Subsequently, the user authentication application 530 receives the notice data from the user authentication server 300. The user authentication application 530 judges whether or not "use permission" is set to the notice data. The user authentication application 530 progresses to Step S209 if "use permission" is set to the notice data (Yes in Step S208). The user authentication application 530 progresses to Step S212 if "use non-permission" is set to the notice data (No in Step S208).

(Step S209)

For the case "Yes" in Step S208, the user authentication application 530 outputs the notice data, which "use permission" is set, to the application platform, as shown in (6) of FIG. 4.

(Step S210)

Subsequently, the application platform 520 inputs the notice data, which "use permission" is set. Then, the application platform 520 outputs it to the controller 510, as shown in (7) of FIG. 4.

(Step S211)

Subsequently, the controller 510 inputs the notice data, which "use permission" is set. Thereby, the controller 510 extracts image data from the printing requested data, and, as shown in (8) of FIG. 4, the controller 510 outputs the image data to the printing part 209. Thereby, the printing part 209 prints the image data on a print sheet.

(Step S212)

For "No" in Step S208, the user authentication application 530 transmits the notice data, which "use non-permission" is set, to the PC100 via the network communication part 204, as shown in (9) of FIG. 4. When the notice data, which "use non-permission" is set, is received, the PC100 displays the message for showing the user is not authenticated to the operation display part 103.

In the image forming system 10 in the above second embodiment, by transmitting the printing requested data from the PC100 to the port for printing 510*a* in the controller 510 of the image forming apparatus 200, the user authentication application 530 can perform the user authentication by using the user authentication server 300. That is, in a typical existing user authentication, the user authentication is performed by the user ID and the password, which the user has set in the operation panel 205. On the other hand, when receiving the printing requested data, which the user determination data is stored, from the PC100, the printing requested data can be inputted from the port for printing 510*a*, and the user authentication application 530 can perform the user authentication. For this reason, modification of the existing user authentication process will be unnecessary. Also, the PC100 can transmit the printing requested data to the image forming apparatus 200 without changing the print driver process that the print driver processing part 101*a* performs and only changing the port for printing 510*a* as a transmission destination. Also, by performing the user authentication by using the user authentication server 300, the user authentication server 300 can manage the user ID and the password in a unified manner. Thus, it will not be needed to change the user authentication data provided in the image forming apparatus 200 whenever the user ID and the password are changed, added, or deleted.

Further, in the second embodiment, in a case that a plurality of the image forming apparatuses 200 exist in the image forming system 10, the network communication part 104 of the PC100 will be recognizable the port for printing 510*a* of each the image forming apparatus 200. Thereby, the PC100 can transmit the printing requested data to the port for printing 510*a* of the image forming apparatus 200 specified by the user.

Also, in order to transmit FAX transmission request data and image storage request data from the PC100 to the image forming apparatus 200, for example, it is also possible to provide a FAX transmission application in the image forming apparatus 200. Also, it is also possible to provide the FAX transmission port, which inputs the FAX transmission request data, in the controller 510. Thereby, FAX transmission function is easily realizable. Similarly, image storage function can be realized easily, by providing an image storage application in the image forming apparatus 200 and by providing an image storage port, which inputs an image storage request data, in the controller 510.

As mentioned above, the image forming apparatus and the image forming system in the first embodiment and the second embodiment of the present disclosure can realize the user authentication function easily, when new authentic method and authentication procedure are needed.

Also, as mentioned above, the first embodiment and the second embodiment is explained the present disclosure in detail. However, the above-mentioned embodiments are exemplifications of the present disclosure, and it is obvious not to be limited to these embodiments.

Although the present disclosure is suitable for an image forming apparatus and an image forming system, it is not limited to the image forming apparatus and the image forming system, and can be applied to a general device providing the authentication function as appropriate.

What is claimed is:

1. An image forming apparatus comprising:
a control part that controls the image forming apparatus;
an auxiliary memory part that includes user authentication data;
a network communication part;
an operation panel; and
a printing part;
wherein the image forming apparatus can perform a first user authentication process and a second user authentication process;
wherein the image forming apparatus, if an input of user authentication data is received via the operation panel, performs the first user authentication process which comprises matching the user authentication data input via the operation panel with the user authentication data included in the auxiliary memory part;
wherein the control part includes a controller, an application platform, and an user authentication application;
wherein the user authentication application is created by a user and includes a port for printing that is an opened port and is an interface for inputting the print request data;
wherein the second user authentication process, if a print request data including user determination data and image data is received via the network communication part from an operation terminal, is performed by the user authentication application;
wherein the second user authentication process comprises:
 i) the user authentication application extracting the user determination data from the print request data,
 ii) the user authentication application transmitting the user determination data to the external user authentication server; and
 iii) the user authentication application receiving a notice data for use permission or a notice data for use non-permission from the external user authentication server;
wherein, when the notice data for use permission is received, the user authentication application extracts the image data from the print request data and outputs the extracted image data to the application platform, the application platform outputs the image data to the controller, and the controller outputs the image data to the printing part, and
wherein, when the notice data for use non-permission is received, the user authentication application transmits the notice data for use non-permission to the operation terminal.

2. The image forming apparatus according to claim 1, wherein the user determination data include a user ID and a password.

3. The image forming apparatus according to claim 1, wherein the user authentication data or the user determination data include a digital signature.

4. An image forming system comprising: an operation terminal, an image forming apparatus, and an external user authentication server, wherein each of the operation terminal, the image forming apparatus, and the external user authentication server are connected to a network,
the operation terminal including:
a print driver processing part that transmits, via the network, print request data comprising user determination data and image data to the image forming apparatus; and
a use-non-permission notice data receiving part that receives notice data for use non-permission of the image forming apparatus, and
the image forming apparatus including:
a control part that controls the image forming apparatus;
an auxiliary memory part that includes user authentication data;

a second network communication part;

an operation panel; and a printing part, wherein the image forming apparatus can perform a first user authentication process and a second user authentication process;

wherein the image forming apparatus, if input of user authentication data is received via the operation panel, performs the first user authentication process which comprises matching the user authentication data input via the operation panel with the user authentication data included in the auxiliary memory part, wherein the control part includes a controller, an application platform, and an user authentication application, wherein the user authentication application is created by a user of the image forming apparatus and includes a port for printing that is an opened port and is an interface for inputting the print request data, wherein, the second user authentication process, if the print request data including the user determination data and the image data is received via the second network communication part from the operation terminal, is performed by the user authentication application, wherein the second user authentication process comprises:

i) the user authentication application extracting the user determination data from the print request data, ii) the user authentication application transmitting the user determination data to the external user authentication server; and iii) the user authentication application receiving the notice data for use permission or a notice data for use non-permission from the external user authentication server;

wherein, when the notice data for use permission is received by the the user authentication application from the external user authentication server, the user authentication application extracts the image data from the print request data and outputs the extracted image data to the application platform, and the application platform outputs the image data to the controller, and the controller outputs the image data to the printing part, and wherein, when the notice data for use non-permission is received by the user authentication application from the external user authentication server, the user authentication application transmits the notice data for use non-permission to the operation terminal.

5. The image forming system according to claim 4, wherein the user authentication data or the user determination data include a user ID and a password.

6. The image forming system according to claim 4, wherein the user determination data include a digital signature.

7. The image forming system according to claim 4, wherein the operation terminal displays the use-non permission, when receiving the notice data for use non-permission.

8. The image forming apparatus of claim 1, wherein the image forming apparatus comprises firmware that performs the first user authentication process and wherein the user authentication application is created by the user without modifying the firmware.

9. The image forming apparatus of claim 1, wherein the user authentication application is not a standard application embedded in the image forming apparatus.

10. The image forming system of claim 4, wherein the image forming apparatus comprises firmware that performs the first user authentication process and wherein the user authentication application is created by the user without modifying the firmware.

11. The image forming system of claim 4, wherein the user authentication application is not a standard application embedded in the image forming apparatus.

* * * * *